United States Patent
Fischer (10) Patent No.: US 12,172,145 B2
(45) Date of Patent: Dec. 24, 2024

(54) FORMED BODY BASED ON MAGNESIUM OXIDE AND CALCIUM CARBONATE AND METHOD FOR ITS PREPARATION

(71) Applicant: Lhoist Recherche et Développement S.A., Ottignies-Louvain-la-Neuve (BE)

(72) Inventor: Uwe Fischer, Leverkusen (DE)

(73) Assignee: Lhoist Recherche et Développement S.A., Ottignies-Louvain-la-neuve (BE)

( * ) Notice: Subject to any disclaimer, the term of this patent is extended or adjusted under 35 U.S.C. 154(b) by 905 days.

(21) Appl. No.: 17/253,679

(22) PCT Filed: Jul. 2, 2019

(86) PCT No.: PCT/EP2019/067755
§ 371 (c)(1),
(2) Date: Dec. 18, 2020

(87) PCT Pub. No.: WO2020/007869
PCT Pub. Date: Jan. 9, 2020

(65) Prior Publication Data
US 2021/0178357 A1 Jun. 17, 2021

(30) Foreign Application Priority Data
Jul. 2, 2018 (DE) .......................... 102018115939.0

(51) Int. Cl.
*B01J 20/04* (2006.01)
*B01J 20/28* (2006.01)
(Continued)

(52) U.S. Cl.
CPC .......... *B01J 20/043* (2013.01); *B01J 20/041* (2013.01); *B01J 20/28004* (2013.01);
(Continued)

(58) Field of Classification Search
CPC ... B01J 20/043; B01J 20/041; B01J 20/28004
See application file for complete search history.

(56) References Cited

U.S. PATENT DOCUMENTS

| | | | |
|---|---|---|---|
| 6,322,705 B1 | 11/2001 | Stornes | |
| 2016/0115076 A1 | 4/2016 | Criniere et al. | |
| 2019/0351387 A1* | 11/2019 | Fischer | ................ B01J 20/3078 |

FOREIGN PATENT DOCUMENTS

| | | | |
|---|---|---|---|
| CN | 104478260 | | 4/2015 |
| CN | 104478260 A | * | 4/2015 |

(Continued)

OTHER PUBLICATIONS

English Translation of CN 104478260 A. (Year: 2023).*

(Continued)

*Primary Examiner* — Nicole M. Buie-Hatcher
*Assistant Examiner* — M. Reza Asdjodi
(74) *Attorney, Agent, or Firm* — Honigman LLP; Andrew N. Weber; Jonathan P. O'Brien (57) ABSTRACT

A method for producing a formed body containing magnesium oxide and calcium carbonate is shown and described, comprising the steps: a) Providing the following components: 1) A magnesium oxide component which has the following properties, in each case based on the total weight of the magnesium oxide component: i) Content of magnesium oxide in the dry substance of more than 70% by weight, ii) Ignition loss of less than 25% by weight, iii) Free calcium oxide content of less than 5% by weight, 2) a calcium carbonate component, the components as a whole having a free calcium oxide content of less than 2% by weight, based on the total weight of the components; b) Mixing components 1) and 2) to obtain a mixture; c) Forming at least one formed body from the mixture obtained in b) with the addition of water.

17 Claims, 3 Drawing Sheets pH values were obtained for various alkalinities with a CO2 concentration of 0.4 mmol/dm³.

(51) Int. Cl.
  *B01J 20/30* (2006.01)
  *C02F 1/66* (2023.01)
  *C02F 101/10* (2006.01)

(52) U.S. Cl.
  CPC ... *B01J 20/28019* (2013.01); *B01J 20/28059* (2013.01); *B01J 20/3028* (2013.01); *C02F 1/66* (2013.01); *C02F 2101/10* (2013.01)

(56) References Cited

FOREIGN PATENT DOCUMENTS

| | | | | |
|---|---|---|---|---|
| JP | 2003251371 | 9/2003 | | |
| WO | 2013/046232 | 4/2013 | | |
| WO | 2015007661 | 1/2015 | | |
| WO | 2015/122772 | 8/2015 | | |
| WO | 2016/146566 | 9/2016 | | |
| WO | WO-2016146566 A1 * | 9/2016 | ............ | B01J 20/041 |
| WO | WO-2020007869 A1 * | 1/2020 | ............ | B01J 20/041 |
| WO | 2021018942 | 2/2021 | | |

OTHER PUBLICATIONS

English Translation of CN 104478260 A (Year: 2024).*
NedMag 99. Magnesium & calcium Carbonate Production Source. (Year: 2024).*
International Search Report and Written Opinion of the International Searching Authority from PCT/EP2020/071354 mailed Feb. 4, 2021.
Anonymous, "A Dutch solution for magnesia", Nov. 1, 2004, XP055637694, Retrieved from the Internet: URL:http://www.indmin.com/pdfs/697/67023/cd200411062.pdf, the whole document.
International Search Report and Written Opinion of the International Searching Authority from PCT/EP2019/067755 mailed Jul. 11, 2019.
PCT Demand for International Preliminary Examination (Chapter II) received May 4, 2020 and Response to Written Opinion dated Apr. 29, 2020.
Written Opinion of the International Preliminary Examining Authority mailed Jun. 3, 2020.
Response to Written Opinion of the International Preliminary Examining Authority dated Aug. 3, 2020.
International Preliminary Report on Patentability from PCT/EP2019/067755 completed Nov. 4, 2020.

* cited by examiner

Fig. 1 : pH values were obtained for various alkalinities with a CO2 concentration of 0.4 mmol/dm³.

Fig. 2: pH values were obtained for various alkalinities with a CO2 concentration of 0.7 mmol/dm³.

Fig. 3: pH values were obtained for various alkalinities with a CO2 concentration of 1.0 mmol/dm³.

FORMED BODY BASED ON MAGNESIUM OXIDE AND CALCIUM CARBONATE AND METHOD FOR ITS PREPARATION

The invention relates to a method for producing at least one formed body, a formed body, the use of the formed body as a filter material, the filter material and the use of the filter material.

In the treatment of drinking water, filter materials are used to deacidify the water, which usually contain mineral constituents. An important raw material for the production of such filter materials is dolomitic stone. Dolomitic stone consists of at least 90 percent of the mineral dolomite, which consists of calcium magnesium carbonate $CaMg(CO_3)_2$.

Starting from dolomitic stone, formed bodies, in particular granules, can be produced from semi-calcined dolomite, which are outstandingly suitable as filter material. In semi-calcined dolomite, magnesium is mostly present in the form of magnesium oxide, while calcium is mostly present in the form of calcium carbonate. For the production of granules from semi-calcined dolomite, there are two common methods.

In the first method, raw dolomite is calcined at a temperature of about 750° C. By carefully heating the raw dolomite, only the magnesium carbonate is first converted to magnesium oxide, while the calcium carbonate retains most of its chemical composition. Control of temperature is of great importance in this method for two reasons. First, only the magnesium carbonate should be converted into the corresponding oxide, while the calcium carbonate should not be calcined. Secondly, the magnesium oxide particles must not sinter, so that they remain as reactive as possible. Since hotspots can form when the rock is heated, the granules obtained from the method often have different reactivity profiles with respect to water.

In the second method, a mixture of dolomitic hydrated lime with a certain average grain size is combined with ground, semi-calcined dolomite to subsequently pelletize the mixture and then recarbonate it. The second method has the disadvantage that the recarbonatization step is very energy-intensive and involves a high technical complexity.

In both methods, raw dolomite must first be mined, transported and processed. The processing of raw dolomite represents a comprehensive and time-consuming and labor-intensive method.

Because of these disadvantages of the currently common methods, there is a need for improved methods for the production of formed bodies, in particular granules, from semi-calcined dolomite. Alternatively, formed bodies, in particular granules, could also be made of other raw materials which have a similarly good reaction profile in the deacidification of water as a filter material. It is particularly important that the special reactivity of magnesium oxide and calcium carbonate in semi-calcined dolomite is part of such filter materials.

The present invention thus has as its object to provide a method for producing at least one formed body, in particular a granule, containing magnesium oxide and calcium carbonate.

A further object of the invention is to provide a particularly inexpensive, simple and rapid method for producing this at least one formed body.

Another object of the invention is to provide a formed body which is particularly suitable as a filter material.

A further object of the invention is to provide a formed body which has a similar or better reactivity with respect to water than a formed body of semi-calcined dolomite.

These objects are achieved by the method described in claim 1, the products described in claims 11 and 16 and the uses described in claims 15 and 17.

Advantageous embodiments of the invention are specified in the dependent claims and are explained in detail below.

The method according to the invention for producing at least one formed body containing at least magnesium oxide and calcium carbonate comprises the following steps:
  a) Providing the following components:
    1) a magnesium oxide component which has the following properties, in each case based on the total weight of the magnesium oxide component:
      i) Content of magnesium oxide in the dry substance of more than 70% by weight,
      ii) Ignition loss of less than 25% by weight,
      iii) Free calcium oxide content of less than 5% by weight,
    2) a calcium carbonate component,
  the components as a whole having a free calcium oxide content of less than 2% by weight, based on the total weight of the components;
  b) Mixing components 1) and 2) to obtain a mixture;
  c) Forming at least one formed body from the mixture obtained in b) with the addition of water.

Surprisingly, it has been found that the formed body obtained by the method according to the invention has excellent properties as a filter material for the treatment and deacidification of drinking water. The formed body obtained according to the method of the invention even has an improved reaction profile in water as compared to a semi-calcined dolomite formed body. This surprisingly advantageous reactivity with respect to a formed body made of semi-calcined dolomite ensures that the formed body is particularly well suited as a filter material for the treatment of water, especially drinking water. The inventive method is also much simpler, faster and cheaper than currently conventional method for producing a formed body of semi-calcined dolomite.

Unless otherwise stated, the content of magnesium oxide in the dry substance is determined in particular according to DIN EN 12485, in particular according to DIN EN 12485:2017-10, item 6.9.

Unless otherwise stated, the content of free calcium oxide is determined in particular according to DIN EN 12485, in particular according to DIN EN 12485:2017-10, item 6.8.

When determining the content of a substance according to one of the analytical methods listed in the standard DIN EN 12485, in particular DIN EN 12485:2018-10, it is to be noted that the analytical methods are to be carried out on material which have been obtained after determining the ignition loss at 550° C. At this temperature, calcium hydroxide is converted to calcium oxide. Likewise, magnesium hydroxide is converted to magnesium oxide at this temperature. Thus, in the determination of the magnesium oxide content in the dry substance according to DIN EN 12485, in particular according to DIN EN 12485:2017-10, item 6.9, both the magnesium oxide contained in the material before the ignition loss and the magnesium hydroxide are equally detected as magnesium oxide in the dry substance. Magnesium oxide in the dry substance thus includes, in particular, magnesium oxide and magnesium hydroxide contained in the sample before the ignition loss. Similarly, in the determination of the free calcium oxide according to DIN EN 12485, in particular according to DIN EN 12485:2017-10, item 6.8, both the calcium oxide contained in the material before the ignition loss and the calcium hydroxide are equally determined as free calcium oxide. Free calcium oxide thus includes, in particular, calcium oxide and calcium hydroxide contained in the sample before the ignition loss.

The dry substance is in particular that constituent of a substance which remains after deduction from the mass of the water contained. The water can be present, for example, as water of crystallization or as hydroxide. In particular, a substance is not a dry substance as long as it still contains $H_2O$-formula units. For example, the dry substance, after drying according to DIN EN 12485:2017-10, of a mixture of magnesium oxide and magnesium hydroxide, contains only magnesium oxide.

Important for the method according to the invention is the purity of the magnesium oxide component. The excellent reactivity of the formed body obtainable by the method according to the invention with respect to water is made possible due to the corresponding purity of the magnesium oxide component. The corresponding purity is also of great importance for the use of the granulate for the treatment of drinking water.

The magnesium oxide component preferably has a purity in accordance with the requirements of the standard DIN EN 16004:2012-02, sections 4.2 and 4.3. This section of the standard specifies limits for certain impurities and minor constituents. The content of magnesium oxide in the dry substance of the magnesium oxide component must, for example, be more than 70% by weight, based on the total weight of the magnesium oxide component (standard DIN EN 16004:2012-02, section 4.2). Particularly advantageous is a magnesium oxide having a magnesium oxide content in the dry substance of about 75% by weight, of more than 80% by weight, of more than 85% by weight, of more than 90% weight, of more than 95% by weight, of more than 96% by weight or of more than 97% by weight, based in each case on the total weight of the magnesium oxide component. A particularly high magnesium oxide content in the dry substance in the magnesium oxide component is also advantageous for forming formed bodies from the mixture.

The ignition loss, in particular $CO_2$ and $H_2O$, of the magnesium oxide component is less than 25% by weight, based on the total weight of the magnesium oxide component. Advantageously, the ignition loss of the magnesium oxide component is less than 20% by weight, preferably less than 15% by weight, more preferably less than 10% by weight, more preferably less than 5% by weight, particularly preferably less than 2% by weight, based in each case on the total weight of the magnesium oxide component.

The magnesium oxide component of the method according to the invention preferably contains only small amounts of impurities in accordance with the standard DIN EN 16004:2012-02, Section 4.3. According to the invention, it is provided that the free calcium oxide content does not exceed 5% by weight of the magnesium oxide component, based on the total weight of the magnesium oxide component. It has been found in experimental studies that a free calcium oxide content of less than 4% by weight, less than 3% by weight, less than 2% by weight or less than 1% by weight of the magnesium oxide component, each based on the total weight the magnesium oxide component, is particularly advantageous.

The magnesium oxide component also contains only minor amounts of other impurities in accordance with the standard DIN EN 16004:2012-02, section 4.3. The magnesium oxide component of the method according to the invention preferably contains not more than 2% by weight of silicon dioxide, in particular not more than 1% by weight of silicon dioxide, in each case based on the total weight of the magnesium oxide component. Furthermore, the magnesium oxide component contains not more than 1% by weight of aluminum oxide, in particular not more than 0.5% by weight of aluminum oxide, in each case based on the total weight of the magnesium oxide component. Furthermore, the magnesium oxide component contains not more than 2% by weight of iron oxide, in particular not more than 1% by weight of iron oxide, in each case based on the total weight of the magnesium component.

The high purity of the magnesium oxide component ensures that the at least one formed body obtainable by the method according to the invention has an excellent reactivity with respect to water and is suitable for the treatment of drinking water.

The calcium carbonate component preferably has a purity in accordance with the requirements of the standard DIN EN 1018:2013-08, sections 5.2 and 5.3. The standard DIN EN 1018:2013-08 differentiates between dense calcium carbonate and porous calcium carbonate. In the method according to the invention, dense calcium carbonate is preferably used for the calcium carbonate component. Dense calcium carbonate is more suitable for forming stable formed bodies. However, according to a less preferred embodiment, the calcium carbonate component may also be porous calcium carbonate.

The dense calcium carbonate is subdivided into Type 1, Type 2 and Type 3 calcium carbonate, which have different degrees of purity. All three types of dense calcium carbonate are suitable for the method according to the invention. In this case, Type 1 and Type 2 dense calcium carbonate, which according to the standard DIN EN 1018:2013-08, sections 5.2 and 5.3, have a higher purity than Type 3 dense calcium carbonate, have been found to be expedient. In particular, type 1 dense calcium carbonate is well suited for the method according to the invention.

A high purity of the calcium carbonate component ensures that formed bodies obtainable by the method according to the invention have excellent reactivity with respect to water and are particularly suitable for the treatment of drinking water.

Preferably dolomitic stone is not used as the raw material in the method according to the invention. An advantage of the method is that it can do without the complicated process of mining, transporting and processing the dolomitic stone.

In addition, the use of a particularly pure magnesium oxide component in the method according to the invention ensures that the resulting at least one formed body has a better reactivity with respect to water than a formed body based on semi-calcined dolomite.

According to the invention, the magnesium oxide component and the calcium carbonate component as a whole have a free calcium oxide content of less than 2% by weight, based on the total weight of the magnesium oxide component and the calcium carbonate component.

Preferably, the magnesium oxide component and the calcium carbonate component have a total free calcium oxide content of less than 1.5% by weight, more preferably less than 1% by weight, more preferably less than 0.8% by weight, and most preferably less than 0.5% by weight, based in each case on the total weight of the magnesium oxide component and the calcium carbonate component.

Preferably, the water used in step c) of the method of the invention comprises calcium oxide and/or calcium hydroxide is an amount of less than 0.1% by weight, based on the total weight of the magnesium oxide component, the calcium carbonate component and the water. Advantageously, the water used in step c) of the method according to the invention is essentially free of calcium oxide and/or calcium hydroxide.

Higher amounts of free calcium oxide and/or of calcium oxide and calcium hydroxide may be a hindrance in the forming of formed bodies in the method according to the invention, so that a stable formed body is not obtained. In addition, higher amounts of free calcium oxide and/or of calcium oxide and calcium hydroxide lead to an altered reaction profile with respect to water, which is why corresponding formed bodies are no longer suitable for the same applications for water treatment.

In a particularly preferred embodiment of the invention, the magnesium oxide component has a specific reactivity. According to this particularly preferred embodiment, the magnesium oxide component has such a reactivity that in a citric acid activity test with 100 ml of 4N citric acid solution after addition of 2 g of the magnesium oxide component to the citric acid solution, a phenolphthalein indicator color change from colorless to pink occurs within 90 to 230 seconds, preferably within 100 to 230 seconds, more preferably from 110 to 225 seconds, more preferably from 120 to 220 seconds, more preferably from 125 to 210 seconds.

The citric acid activity is an indicator of the reactivity of a sample of the magnesium oxide component. The method measures the rate at which a citric acid solution reaches a pH of 8.2 by the successive dissolution of a basic material. At this pH, the color of the indicator phenolphthalein changes from colorless to pink.

The citric acid activity test is carried out as follows: 100 ml of the 4N citric acid solution (mixed with phenolphthalein) are placed in a 250 ml Erlenmeyer flask, have an agitator added and are heated to 30° C. in a water bath. Reaching this temperature is controlled by a thermometer in the solution. When the solution reaches 30±1° C., the flask is quickly removed from the water bath, placed on a magnetic stirrer and immediately added to 2 g of the sample of magnesium oxide component to be analyzed. The material is added so that no residues remain on the glass wall.

A stopwatch is started simultaneously with the addition of the material. The time is stopped when the indicator turns from colorless to pink. Here, the time until the onset of the color reaction (first pale pink color) and the time to the completed color change (constant, non-changing pink color) are noted in seconds. The first number (start of the color reaction) represents the lower limit value, the second number (completed color change) the upper limit value. Both the first and second numbers must, according to a preferred embodiment, be within the preferred time range.

Thus, a sample of a magnesium oxide component in which the onset of the color reaction according to the citric acid activity test occurs after 120 seconds and the completed color change occurs after 170 seconds thus satisfies the requirements of a preferred embodiment of the invention.

The particular reactivity of the magnesium oxide component has proved to be advantageous for the forming step of the at least one formed body and for the reactivity of the formed body in water. With such reactivity, the magnesium oxide of the magnesium oxide component efficiently binds water. The resulting magnesium hydroxide ensures a certain stickiness, which is advantageous for forming the at least one formed body, in particular for granulating a granulate. In the case of this reactivity of the magnesium oxide component, particularly stable and robust formed bodies, in particular granules, are formed which are outstandingly suitable as filter materials for water treatment.

If the reactivity of the magnesium oxide component is lower than in the preferred embodiment of the invention, only a small amount of magnesium oxide from the water is converted to magnesium hydroxide. To compensate for this, either more water or a longer period of time for the reaction with water must be chosen. Formed bodies obtained in this manner do not have the same stability and reactivity as formed bodies obtained from a magnesium oxide component having reactivity according to the preferred embodiment of the invention. Sintered magnesium oxide particles are often not reactive enough for the production of formed bodies.

If the reactivity of the magnesium oxide component is higher than according to the preferred embodiment of the invention, too much hydroxide is formed. In addition, too much heat can arise in the reaction of magnesium oxide with water, whereby the formation of formed bodies is difficult.

According to a further preferred embodiment of the invention, in method step c) water is added in an amount of 1% to 30% by weight, preferably 2% to 25% by weight, preferably 3% to 20% by weight, more preferably 4% to 18% by weight, and especially preferably 5% to 15% by weight, in each case based on the total amount of water, magnesium oxide component and calcium carbonate component.

This amount of water has proven to be particularly advantageous for the production of formed bodies, in particular granules. With this amount of water, the at least one formed body, in particular the granules, reaches a very high stability.

According to a particularly preferred embodiment, the magnesium oxide component has such a reactivity that in a citric acid activity test with 100 ml of 4N citric acid solution after addition of 2 g of the magnesium oxide component to the citric acid solution, a color change of a phenolphthalein indicator from colorless to pink occurs within 90 to 230 seconds, in particular within 100 to 230 seconds, from 110 to 225 seconds or 120 to 220 seconds, and at the same time in method step c) water in an amount of 1% to 30% by weight, preferably 2% to 25% by weight, preferably 3% to 20% by weight, more preferably 4% to 18% by weight, and particularly preferably 5% to 15% by weight, each based on the total amount of water, is added to magnesium oxide component and calcium carbonate component.

Under these conditions, particularly stable formed bodies are formed which have excellent properties as a filter material. The reactivity of the magnesium oxide component is then also particularly well matched to the amount of water.

The $d_{50}$ value of the magnesium oxide component is, according to a preferred embodiment of the invention, less than 100 μm, preferably less than 90 m or less than 80 μm, preferably less than 60 μm or less than 40 μm, more preferably less than 30 m or less than 20 μm, more preferably less than 15 μm, particularly preferably less than 10 μm.

According to a further embodiment, the magnesium oxide component has a $d_{90}$ value of less than 100 μm, preferably less than 50 μm, more preferably less than 35 μm and particularly preferably less than 20 μm.

A magnesium oxide component having such $d_{50}$ values and/or $d_{90}$ values is advantageous for the forming of formed bodies, since in this case particularly hard and stable formed bodies can be obtained by the method according to the invention. On the other hand, if the magnesium oxide component has larger $d_{50}$ values and/or $d_{90}$ values, the formed bodies formed are less stable and more prone to breakage.

The $d_{50}$ value of the calcium carbonate component is, according to one embodiment of the invention, less than 100

µm, preferably less than 90 µm or less than 80 µm, preferably less than 60 µm or less than 40 µm, more preferably less than 30 m or less than 20 µm, more preferably less than 15 µm or very particularly preferably less than 10 µm.

According to a further embodiment, the calcium carbonate component has a $d_{90}$ value of less than 100 µm, preferably less than 50 µm, more preferably less than 35 µm and particularly preferably less than 20 µm.

A calcium carbonate component having such $d_{50}$ values and/or $d_{90}$ values is particularly well compatible with the magnesium oxide component for forming formed bodies.

Values for the particle sizes, in particular $d_{50}$ values and/or $d_{90}$ values, of particles of a powder can be determined, for example, by the particle size distribution of the powder. The $d_{50}$ value is usually understood as the value at which 50% by weight of the powder would pass through the openings of a certain size of a theoretical sieve. The value $d_{90}$ is usually understood as the value at which 90% by weight of the powder would pass through the openings of a certain size of a theoretical sieve. To determine the particle size distribution, various methods are known to those skilled in the art. For example, the particle size distribution can be determined by sieving experiments. The particle size distribution can also be determined by laser diffractometry, in particular according to ISO 13320:2009. In determining the particle size distribution of a powder by laser diffractometry, the powder to be tested may be suspended in a liquid medium, for example in ethanol, and the suspension may be subjected to ultrasonic treatment, for example for 120 seconds, followed by a pause, for example 120 seconds. The suspension can also be stirred, for example at 70 rpm. The particle size distribution can then be determined by plotting the measurement results, in particular the cumulative sum of the mass percentages of the measured particle sizes against the measured particle sizes. The $d_{50}$ value and/or the $d_{90}$ value can then be determined on the basis of the particle size distribution. For the determination of the particle size distribution and/or the $d_{50}$ value and/or the $d_{90}$ value of a powder by laser diffractometry, for example, a particle size analyzer Helos available from the company Sympatec can be used with additional Sucell dispersion equipment. Preferably, the $d_{50}$ value and the $d_{90}$ value are determined by laser diffractometry as described herein.

In the method according to the invention, according to a preferred embodiment, the amount of magnesium oxide component provided is from 20% to 50% by weight, preferably from 22% to 45% by weight, preferably from 24% to 40% by weight, more preferably from 25% to 37% by weight, more preferably from 28% to 35% by weight, particularly preferably from 30% to 33% by weight, or very particularly preferably 32% by weight, in each case based on the amount of magnesium oxide component and calcium carbonate component.

Accordingly, the amount of calcium carbonate component provided, according to a preferred embodiment of the invention, is from 50% to 80% by weight, preferably from 55% to 78% by weight, preferably from 60% to 76% by weight, more preferably from 63% to 75% by weight, more preferably from 65% to 72% by weight, particularly preferably from 67% to 70% by weight, or very particularly preferably 68% by weight, in each case based on the amount of magnesium oxide component and calcium carbonate component.

By means of these amounts of magnesium oxide component and calcium carbonate component, formed bodies, in particular granules, can be obtained which are outstandingly suitable as filter material for the treatment of drinking water.

Due to the different reactivity of the two components, an optimum balance is thus established between the particularly reactive magnesium oxide and the more selective calcium carbonate.

According to one embodiment of the invention, components 1) and 2) are provided in method step a) in a silo. Basically, any silo that is suitable for storing the individual components is suited as silo for the inventive method.

In method step b), the mixing of components 1) and 2) takes place. Preferably, components 1) and 2) are mixed in a mixer. In principle, the magnesium oxide component and the calcium carbonate component can be introduced into the mixer in any possible sequence as well as at the same time; components 1) and 2) are preferably introduced simultaneously into the mixer.

The components 1) and 2) can be mixed with each other for different lengths of time. Preferably, in method step b), the components 1) and 2) are mixed until a homogeneous mixture is obtained. It has been found that a mixing time of 5 to 60 minutes, preferably 15 to 40 minutes, is advantageous in order to obtain a good mixing, in particular a homogeneous mixture, and nevertheless to maintain an efficient method.

In the subsequent method step c), the forming of the at least one formed body from the mixture is carried out from method step b) with the addition of water. A dish granulator is particularly well suited for the method step c), into which the mixture from method step b) is first introduced and then water is introduced. According to an alternative embodiment, the method step may also be carried out in another reactor, for example in a cement mixer or in another rotating reactor. It has generally been found that it is particularly advantageous when the water is sprayed in order to ensure optimum distribution of the water during introduction.

The mixture can be formed for various periods with the addition of water to at least one formed body, in particular a granulate. In principle, the mixture can be formed for a few minutes (e.g. five minutes) up to a few hours, for example overnight (e.g. 16 hours) with the addition of water. However, in order to achieve an optimum ratio of efficiency and product quality, it has proven to be advantageous to form the mixture for a period of 10 minutes to 240 minutes with the addition of water to at least one formed body, in particular a granulate. More preferably, the mixture is formed for a period of from 20 minutes to 180 minutes, preferably from 30 minutes to 150 minutes, preferably from 45 minutes to 120 minutes, more preferably from 50 minutes to 100 minutes, particularly preferably from 60 minutes to 90 minutes, with the addition of water to at least one formed body, in particular a granulate.

After the mixture produced in method step b) was formed in method step c) with the addition of water, the at least one formed body, in particular the granulate, can be cooled. Subsequently, the at least one formed body, in particular the granulate, can be classified. The cooling may, according to a preferred embodiment of the invention, take place in an open steel container. The cooling of the at least one formed body, in particular of the granulate, preferably lasts 2 to 3 hours.

The classification of the at least one formed body, in particular of the granulate, can be carried out by sieves of different mesh size. In this way, a division of formed bodies into different particle size groups occurs. Typical particle size groups are the particle size groups 0 to 3. In this case, the particle size group 0 preferably comprises formed bodies having a particle size of less than 0.5 mm. The particle size group 1 preferably comprises formed bodies having a particle size of 0.5 to 2.5 mm. The particle size group 2 preferably comprises formed bodies having a particle size of 2.0 to 4.5 mm. The particle size group 3 preferably comprises formed bodies with a particle size of more than 4.5 mm. The particle size groups preferably each have a maximum of 10% by weight of oversize and a maximum of 10% by weight of undersize.

The entire method is carried out batchwise according to one preferred embodiment. However, it is also possible to carry out the method continuously.

In addition to the magnesium oxide component, the calcium carbonate component and the water added to form the at least one formed body, further components can be used in the method according to the invention. Possible further components are calcium silicates, calcium phosphates, magnesium hydroxide, magnesium silicates, aluminum oxide, iron oxide, silicon dioxide, cement stone, clay, sand, halite (sodium chloride), sulfur, sulfur trioxide, anhydrite (calcium sulfate) and mixtures thereof.

Formed bodies within the meaning of the invention are, for example, pellets, grains or granules, particularly preferably granules.

For the purposes of the invention, forming is, for example, pelleting or granulating, more preferably granulating.

The invention further relates to a formed body.

The inventive formed body contains calcium carbonate and magnesium oxide and has a content of magnesium oxide in the dry substance of at least 23% by weight, a content of calcium carbonate of at least 40% by weight, and a content of free calcium oxide of less than 2% by weight, in each case based on the total weight of the formed body.

The formed body according to the invention is distinguished by a particularly good reactivity for the deacidification of water. The formed body according to the invention is preferably obtainable or prepared by the method according to the invention.

According to one preferred embodiment of the invention, the formed body according to the invention has a content of magnesium oxide in the dry substance of at least 25% by weight, preferably at least 30% by weight, more preferably at least 32% by weight, more preferably at least 35% by weight, particularly preferably at least 40% by weight, each based on the total weight of the formed body.

According to one further preferred embodiment of the invention, the formed body according to the invention has a content of calcium carbonate of at least 45% by weight, preferably of at least 50% by weight, more preferably of at least 60% by weight, more preferably of at least 65% by weight, more preferably of at least 68% by weight, based in each case on the total weight of the formed body.

According to one further preferred embodiment of the invention, the formed body according to the invention has a free calcium oxide content of less than 1.8% by weight, preferably less than 1.5% by weight, more preferably less than 1.3% by weight, more preferably less than 1.0% by weight, more preferably less than 0.8% by weight, more preferably less than 0.7% by weight, even more preferably less than 0.6% by weight, particularly preferably less than 0.5% by weight, and particularly preferably of less than 0.4% by weight, each based on the total weight of the formed body.

In these quantitative ranges of the constituents of the formed body, the formed body is particularly well suited for the treatment of drinking water. With these compositions, the reactivity of the formed body is particularly well adapted to the requirements of drinking water treatment.

The formed body according to the invention may have a size in a wide range. The size of the formed body may in particular be the volume-equivalent spherical diameter. The volume-equivalent spherical diameter indicates the diameter of a sphere of the same volume as the particle under consideration.

A size of 0.1 to 4 mm has proven to be advantageous for the size of the formed body. According to a further preferred embodiment of the invention, the formed body has a size of 0.25 to 3 mm, most preferably 0.5 to 2.5 mm. A formed body of such a size is particularly well suited as a filter material.

The formed body according to the invention may have very different porosities. A porosity of 10% to 20%, preferably 12% to 18%, has been found to be preferred.

The formed body according to the invention can furthermore have a BET surface area of from 1 to 10 $m^2/g$, preferably from 1 to 5 $m^2/g$. The BET surface area can be determined according to standard ISO 9277, in particular according to standard ISO 9277:2010. As a result, the formed body according to the invention has a high activity.

In addition, the formed body according to the invention also has such a reactivity that raw water is treated by treatment with formed bodies according to the invention within an EBCT value (Empty Bed Contact Time) of less than 20 minutes, preferably less than 15 minutes, more preferably less than 10 minutes, especially preferably less than 8 minutes, such that the water subsequently has a calcite dissolving capacity of less than 5 mg/l.

Preferably, the raw water, which is being treated with formed bodies according to the invention, has a water temperature of 8.6° C., a pH of 5.6, a conductivity of 120 μS/cm, a calcium content of 7 mg/l, a magnesium content of 2 mg/i, a base capacity up to pH 8.2 ($K_{B\,8.2}$) of 0.75 mmol/l and an acid capacity up to pH 4.3 ($K_{s\,4.3}$) of 0.2 mmol/l. Preferably, the stated EBCT value is achieved with an open filter with a filter material layer thickness of 1000 to 2000 mm. The filter speed is advantageously up to 15 m/h. In this case, formed bodies according to the invention are used as filter material.

The calcite dissolving capacity is calculated in particular according to the standard DIN 38404 C 10, preferably according to the standard DIN 38404-10:2012-12 (Title: German standard methods for water, wastewater and sludge examination—Physical and physical-chemical substance characteristics (Group C)—part 10: Calculation of calcite saturation of a water (C 10)).

The formed body preferably has a particle size of 0.5 to 2.5 mm. The formed bodies used in the filter material preferably belong to the particle size group with a particle size of 0.5 to 2.5 mm. For the undersize and the oversize, the above applies accordingly.

In particular, the EBCT value describes a measure of the time that a raw water to be treated is in contact with the treatment medium in a container, assuming that all the raw water flows through the container at the same rate. The EBCT value can be calculated as the quotient of the volume of the particles of the treatment medium by the volumetric flow rate.

The formed body according to the invention is preferably obtainable by the method according to the invention. Advantageously, the formed body is produced by the method according to the invention.

The formed body according to the invention preferably contains less than 1% by weight of silicon dioxide, expressed as $SiO_2$, based on the total weight of the formed body.

According to one further embodiment of the invention, the formed body has an aluminum oxide content, stated as $Al_2O_3$, of less than 2% by weight, more preferably less than 1% by weight, in each case based on the total weight of the formed body. The formed body preferably has an iron oxide content, expressed as $Fe_2O_3$, of less than 2% by weight, more preferably less than 1% by weight, in each case based on the total weight of the formed body. Advantageously, the formed body has a sulfate content, expressed as $SO_4$, of less than 1% by weight, more preferably less than 0.5% by weight, in each case based on the total weight of the formed body.

According to one preferred embodiment of the invention, the formed body according to the invention fulfills all the requirements of Section 4.3 of the standard DIN EN 1017: 2008-04 for products for the treatment of water for human use—semi-calcined dolomite. According to one further particularly preferred embodiment of the invention, the formed body according to the invention fulfills all the requirements of the standard DIN EN 1017:2008-04 for products for the treatment of water for human use—semi-calcined dolomite.

The invention further relates to the use of the formed body according to the invention as a filter material.

The formed body according to the invention is particularly suitable as a filter material for water processing. Here, the formed body can be used as a filter material for reprocessing waste water, industrial wastewater, dirty water, industrial return water, agricultural waste water or drinking water. The formed body of the invention is particularly well suited as a filter material for the treatment of drinking water.

The use of the formed body according to the invention in this case serves in particular for deacidification of the water.

With this use of the formed body according to the invention, the efficient processing of drinking water is successful under consideration of the required standards of water for human use.

The invention further relates to a filter material comprising a formed body according to the invention.

Furthermore, the invention also relates to the use of the filter material according to the invention for the deacidification of water.

The invention is explained in more detail below by way of examples, which, however, serve only as an illustration and are not limiting.

EXAMPLES

A mixture of 32% by weight of magnesium oxide (nedMag99, Nedmag BV; >97% by weight of magnesium oxide in the dry substance, 0.70% by weight of loss on ignition, 0.74% by weight of free calcium oxide, 0.2% by weight or less $SiO_2$) and 68% by weight powdered limestone (0/60 my—T 756, August Hutter GmbH; >98% $CaCO_3$, <0.8% by weight $SiO_2$) was placed on a dish granulator and granulated with the addition of water. On the dish granulator, the granulation reaction then takes place without additional heat. The heat of reaction also leads to the drying of the formed granules.

Granules with the following particle size distribution were obtained:

| Particle size group | Particle size [mm] | Share [weight %] |
|---|---|---|
| Particle size group 0 | <0.5 | 1.0 |
| Particle size group 1 | 0.5-2.5 | 80.3 |
| Particle size group 2 | 2.0-4.5 | 10.7 |
| Particle size group 3 | >4.5 | 8.0 |

The average hardness of the granules obtained from the method was 45 N.

The granules had a free calcium oxide content of 0.3% by weight. The content of free calcium oxide was determined according to DIN EN 12485:2017-10, item 6.8.

With the particle size group 1 of the granules thus obtained, a water having a water temperature of 8.6° C., a pH of 5.6, a conductivity of 120 µS/cm, a calcium content of 7 mg/l, a magnesium content of 2 mg/l, a base capacity up to pH 8.2 ($K_{B\ 8.2}$) of 0.75 mmol/l and an acid capacity up to pH 4.3 ($K_{S\ 4.3}$) of 0.2 mmol/l was freed of carbonic acid within an EBCT Value (Empty Bed Contact Time) of 5 to 6 minutes to the extent that a calcite dissolving capacity of less than 5 mg/l was present. For the same water, a comparative granulate with the same particle size based on semi-calcined dolomite which was obtained from dolomitic stone, required an EBCT value of 9 to 10 minutes for the same treatment result.

The calcite dissolving capacity was calculated according to the standard DIN 38404-10:2012-12 (Title: German standard methods for the examination of water, waste water and sludge—Physical and physical-chemical parameters (group C)—Part 10: Calculation of calcite saturation of a water (C 10)).

Hence, granules obtained according to the inventive method have improved water treatment properties over granules of semi-calcined dolomite which were obtained by conventional production methods.

In another example, a granulated product (P1) according to the invention was compared to a commercial product (CP) used for neutralization and remineralization of aggressive water, i.e. water that has some excess of carbon dioxide.

Product P1 is a granular material obtained from a mixture of 32 parts of a magnesium oxide component and 68 parts of a calcium carbonate component. The particle size of the granules after sieving was between 1.4 and 1.6 mm. The average composition of granular material P1 measured on 10 samples, by XRF and LOI on dry basis is presented below:

| | |
|---|---|
| $CaCO_3$ | 68.5% |
| $MgCO_3$ | 0.3% |
| MgO | 30.6% |
| $SiO_2$ | 0.1% |
| $Fe_2O_3$ | 0.2% |
| $Al_2O_3$ | 0.2% |
| $Mn_2O_3$ | 0.1% |

0.3 dm$^3$ of the product P1 was filled into a first column having a volume of 3 dm$^3$ and a diameter of 0.1 m. Columns were preliminary backwashed during 2 min using tap water at a flowrate of 8 dm$^3$/min. To characterize the system, the empty bed contact time (EBCT) was used. In this case, the system was operating at 20° C., the water to be treated had an initial concentration of $CO_2$ between 0.4 and 0.7 mmol/L and initial concentrations of $Ca^{2+}$ and $Mg^{2+}$ of 11 mg/L and 5.0 mg/L, respectively. EBCT from 2 to 4 minutes were applied. The pilot unit was operated at a flow rate of 6 dm³/h for 5 days without interruptions.

The water was also treated under equivalent conditions in a column containing the commercial product CP as a comparative example, wherein the commercial product CP was sieved to have a grain size between 1.4 and 1.6 mm. The commercial product CP was obtained from semi-calcined dolomite. The composition of commercial product CP measured on 10 samples, by XRF and LOI on dry basis is presented below:

| | |
|---|---|
| CaCO$_3$ | 68.9% |
| CaO | 1.4% |
| MgO | 25.4% |
| MgCO$_3$ | 0.5% |
| Fe$_2$O$_3$ | 0.5% |
| Al$_2$O$_3$ | 0.2% |
| SiO$_2$ | 0.4% |
| Water | 2.7% |

Figure 1:
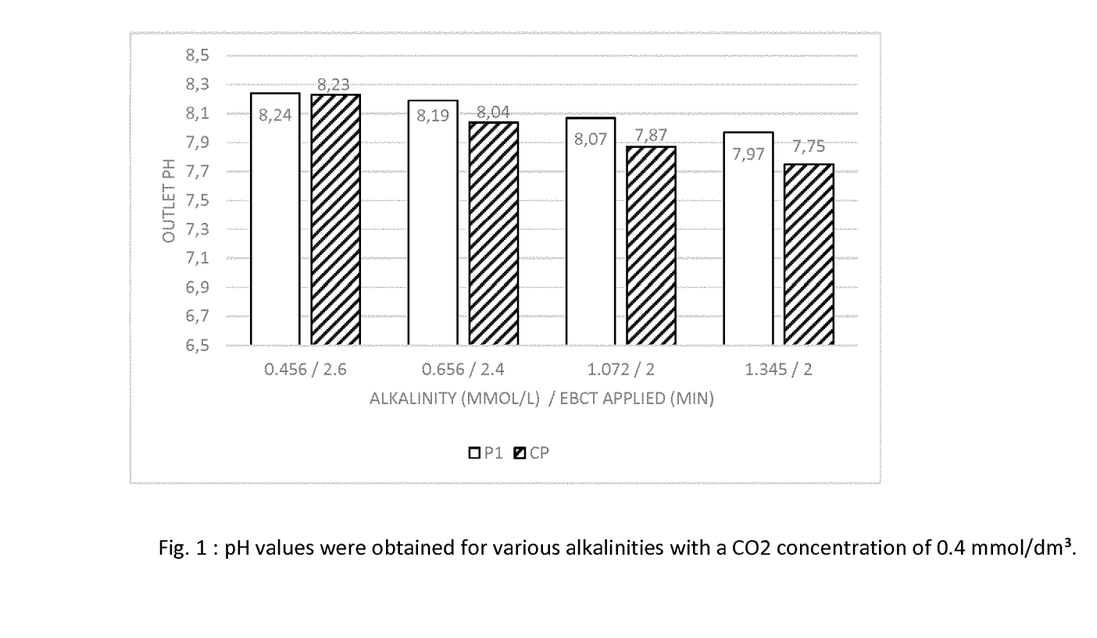
FIG. 1: pH values of water after neutralization with filter material P1 and CP at $CO_2$ concentration of 0.4 mmol/dm$^3$.

FIG. 1 shows pH-values of treated water at the outlet of the column using a column containing product P1 according to the invention compared with pH-values of treated water at the outlet of a column containing the commercial product CP as comparative example. The pH-values were obtained for various alkalinities with a CO$_2$ concentration of 0.4 mmol/dm³. In all the cases, the pH-values are slightly higher for the inventive product P1 but the difference of pH obtained at the outlet with the two examples does not exceed 5%.

Figure 2:
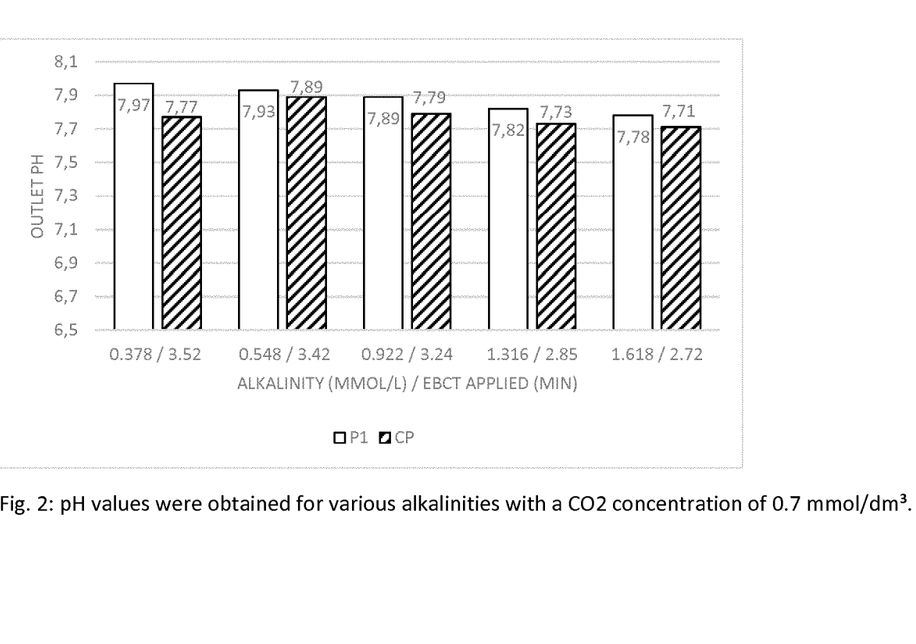
FIG. 2: pH values of water after neutralization with filter material P1 and CP at $CO_2$ concentration of 0.7 mmol/dm$^3$.

FIG. 2 shows pH-values of treated water at the outlet of the column using a column containing product P1 according to the invention compared with the pH-values of treated water at the outlet of a column containing the commercial product CP as comparative example. The pH-values were obtained for various alkalinities with a CO$_2$ concentration of 0.7 mmol/dm³. In all the cases, the pH-values are slightly higher for the inventive product P1 but the difference of pH obtained at the outlet with the two examples does not exceed 5%.

Figure 3:
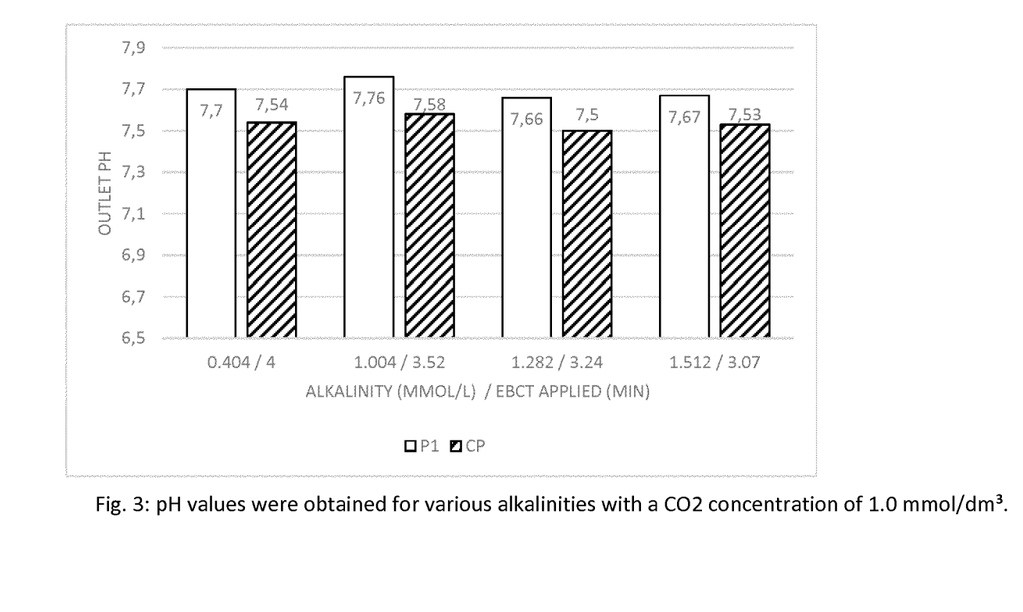
FIG. 3: pH values of water after neutralization with filter material P1 and CP at $CO_2$ concentration of 1.0 mmol/dm$^3$.

FIG. 3 shows pH-values of treated water at the outlet of the column using a column containing product P1 according to the invention compared with pH-values of treated water at the outlet of a column containing the commercial product CP as comparative example. The pH-values were obtained for various alkalinities with a CO$_2$ concentration of 1 mmol/dm³. In all the cases, the pH-values are slightly higher for the inventive product P1 but the difference of pH obtained at the outlet with the two examples does not exceed 5%.

Table 1 shows the final alkalinity of treated water that was filtered through either a filter containing product P1 according to the invention or a filter containing commercial product CP, for various water samples having particular initial alkalinities and a particular initial CO$_2$ concentrations. The difference in final alkalinity between the water sample treated with P1 and the water sample treated with CP is shown in percent [%].

| Initial Alkalinity [mmol/L] | Initial CO$_2$ [mmol/L] | EBCT applied [min] | Final Alkalinity | | |
|---|---|---|---|---|---|
| | | | P1 [mmol/L] | CP [mmol/L] | % difference |
| 0.456 | 0.4 | 2.6 | 0.828 | 0.822 | 0.72 |
| 0.656 | 0.4 | 2.4 | 1.082 | 1.088 | 0.55 |
| 1.072 | 0.4 | 2.2 | 1.392 | 1.31 | 5.89 |
| 1.4 | 0.4 | 2.1 | 1.514 | 1.512 | 0.13 |
| 0.378 | 0.7 | 3.5 | 1.158 | 1.158 | 0 |
| 0.548 | 0.7 | 3.4 | 1.22 | 1.292 | 5.9 |
| 0.922 | 0.7 | 3.2 | 1.596 | 1.448 | 9.27 |
| 1.316 | 0.7 | 2.9 | 1.914 | 1.928 | 0.73 |
| 1.618 | 0.7 | 2.7 | 2.08 | 2.11 | 1.44 |
| 0.404 | 1 | 4 | 1.506 | 1.444 | 4.12 |
| 0.714 | 1 | 3.8 | 1.792 | 1.79 | 0.11 |
| 1.004 | 1 | 3.5 | 1.92 | 1.872 | 2.5 |
| 1.282 | 1 | 3.2 | 2.262 | 2.162 | 4.42 |
| 1.512 | 1 | 3.1 | 2.292 | 2.296 | 0.17 |

The difference of alkalinities of water treated with product P1 according to the invention compared to water treated with commercial product CP does not exceed 10%.

Thus, the inventive product P1 provides an excellent deacidification of aggressive water. The product of the invention represents an excellent alternative to commercial products based on semi-calcined dolomite.

The invention claimed is:

1. A method comprising the steps of:
   a) Providing:
      a magnesium oxide component; and
      a calcium carbonate component;
   b) Mixing the magnesium oxide component with the calcium carbonate component for:
      obtaining a dry mixture; and
   c) Forming at least one formed body by:
      adding water to the dry mixture; and
      conducting a granulation reaction to the dry mixture that leads to:
         drying the at least one formed body,
   wherein, based on a total weight of the magnesium oxide component, the magnesium oxide component includes:
      i) a content of magnesium oxide in dry substance of more than 70% by weight;
      ii) an ignition loss of less than 25% by weight; and
      iii) a free calcium oxide content of less than 5% by weight,
   wherein the magnesium oxide component and the calcium carbonate component have a free calcium oxide content of less than 2% by weight, based on a total weight of the the magnesium oxide component and the calcium carbonate component.

2. The method according to claim 1, characterized in that the magnesium oxide component has a reactivity such that, in a citric acid activity test with 100 ml of 4N solution of citric acid after addition of 2 g of the magnesium oxide component to the solution of citric acid, a color change of a phenolphthalein indicator from colorless to pink occurs within 90 to 230 seconds.

3. The method according to claim 1, characterized in that step c) further comprises:
   adding 1% to 30% of water by weight, based on a total amount of:
      the magnesium oxide component;
      the calcium carbonate component; and
      the water.

4. The method according to claim 1, characterized in that the magnesium oxide component has:
   a d50 value of less than 100 µm.

5. The method according to claim 1, characterized in that the calcium carbonate component has:
   a d50 value of less than 100 μm.

6. The method according to claim 1, characterized in that the magnesium oxide component is:
   20% to 50% by weight, based on a total amount of the magnesium oxide component and the calcium carbonate component.

7. The method according to claim 1, characterized in that the of calcium carbonate component is:
   50% to 80% by weight, based on a total amount of the magnesium oxide component and the calcium carbonate component.

8. The method according to claim 1, wherein the method further includes:
   providing a mixer and a dish granulator, wherein the mixing of the magnesium oxide component and the calcium carbonate component of step b) is conducted in:
   the mixer,
   wherein the conducting the granulation reaction to the dry mixture of step c) is conducted in:
   the dish granulator.

9. The method according to claim 1, wherein the dry mixture is homogeneous, wherein the adding the water to the dry mixture of step c) includes:
   spraying the water on the dry mixture.

10. The method according to claim 1, wherein the mixing of the magnesium oxide component and the calcium carbonate component of step b) includes:
    mixing the magnesium oxide component with the calcium carbonate component for a period of 5 to 60 minutes, wherein the forming at least one formed body of step c) includes:
    forming the at least one formed body for a period of 10 to 240 minutes.

11. The method according to claim 1, wherein the conducting the granulation reaction to the dry mixture of step c) includes:
    generating heat that results in the drying the at least one formed body.

12. The method according to claim 11, wherein the conducting the granulation reaction to the dry mixture of step c) includes:
    conducting the granulation without additionally heating the dry mixture.

13. The method according to claim 1, wherein after forming the at least one formed body of step c), the method further includes:
    cooling the at least one formed body.

14. The method according to claim 13, wherein the method further includes:
    providing an open steel container, wherein the cooling of the at least one formed body of step c) is conducted in:
    the open steel container.

15. The method according to claim 13, wherein the cooling of the at least one formed body of step c) includes:
    cooling the at least one formed body for a period of 2 to 3 hours.

16. The method according to claim 13, wherein after cooling the at least one formed body of step c), the method further includes:
    classifying the at least one formed body.

17. The method according to claim 16, wherein the method further includes:
    providing sieves of different mesh size, wherein the classifying of the at least one formed body of step c) is conducted in:
    the sieves of different mesh size.

* * * * *